United States Patent [19]
Sato et al.

[11] Patent Number: 5,710,211
[45] Date of Patent: Jan. 20, 1998

[54] PROCESS FOR PRODUCING VINYL ALCOHOL POLYMER

[75] Inventors: Toshiaki Sato; Naoki Fujiwara; Atsushi Jikihara, all of Kurashiki, Japan

[73] Assignee: Kuraray Co., Ltd., Kurashiki, Japan

[21] Appl. No.: 684,484

[22] Filed: Jul. 19, 1996

[30] Foreign Application Priority Data

Aug. 1, 1995 [JP] Japan ................... 7-196713
Aug. 1, 1995 [JP] Japan ................... 7-196714

[51] Int. Cl.$^6$ ........................................ C08F 8/00
[52] U.S. Cl. ................... 525/62; 525/57; 525/58; 525/116; 525/208; 525/212; 525/276; 525/279; 525/283; 525/284; 525/286; 525/288; 525/289; 525/291; 525/326.5; 525/326.9; 525/327.3; 525/328.5; 525/330.4; 525/330.3; 525/330.6; 525/342; 525/343; 525/348; 525/349; 525/330.5; 525/350

[58] Field of Search ............... 525/62, 286, 291, 525/327.3, 328.5, 330.4, 57, 58, 116, 208, 212, 276, 279, 283, 284, 288, 289, 326.5, 326.9, 330.3, 330.5, 330.6, 342, 343, 348, 349, 350; 523/400, 435

[56] References Cited

U.S. PATENT DOCUMENTS

| | | | |
|---|---|---|---|
| 2,378,536 | 6/1945 | Brubaker | 525/328.5 |
| 2,831,830 | 4/1958 | Schroeder | 525/327.3 X |
| 2,992,210 | 7/1961 | Gluckman | 525/327.3 X |
| 3,052,657 | 9/1962 | Calhoun et al. | 525/330.4 |
| 3,166,504 | 1/1965 | Krukziener et al. | 525/328.5 X |
| 3,310,540 | 3/1967 | Fang | 525/328.5 |
| 3,354,130 | 11/1967 | Hornung et al. | 525/330.4 X |
| 4,239,865 | 12/1980 | Tarao et al. | 525/330.4 |
| 5,349,008 | 9/1994 | Takada et al. | 525/330.4 X |

FOREIGN PATENT DOCUMENTS

| | | | |
|---|---|---|---|
| 602986 | 8/1960 | Canada | 525/327.3 |
| 48211 | 10/1985 | Japan | 525/327.3 |
| 398567 | 9/1973 | U.S.S.R. | 525/327.3 |
| 722258 | 1/1955 | United Kingdom . | |
| 0740720 | 11/1955 | United Kingdom | 525/327.3 |

*Primary Examiner*—Judy M. Reddick
*Attorney, Agent, or Firm*—Oblon, Spivak, McClelland, Maier & Neustadt, P.C.

[57] ABSTRACT

According to the present invention, there are provided a process for producing a vinyl alcohol polymer comprising reaction of a vinyl ester polymer (A) having an epoxy group with a compound (B) having a thiol or thioester group and hydrolysis thereof, said hydrolysis being conducted during or after said reaction; and a process for producing a vinyl alcohol polymer comprising reaction of a vinyl ester polymer (C) having a thiol or thioester group with a compound (D) having an epoxy group and hydrolysis thereof, said hydrolysis being conducted during or after said reaction. According to the present invention, it is possible to efficiently introduce into PVA various functional groups having excellent reactivity, crosslinkability, ionic interactivity, water-solubility, interfacial physical properties, low-temperature flexibility, etc., under relatively mild reaction conditions. According to the present invention, in addition, it is possible to introduce into PVA such various functional groups, which could not be obtained by conventional methods.

17 Claims, No Drawings

PROCESS FOR PRODUCING VINYL ALCOHOL POLYMER

BACKGROUND OF THE INVENTION

1. Field of the Invention

The present invention relates to a novel process for producing a modified vinyl alcohol polymer.

2. Description of the Prior Art

Since polyvinyl alcohol (hereinafter referred to as PVA) is one of a few, crystalline, water-soluble polymers with good interfacial characteristics and mechanical characteristics, it is used for paper-processing, fiber-processing and emulsion stabilizers and, in addition, it is important as a raw material for PVA films and PVA fibers. Studies of producing PVA with improved functions have been and are being made by controlling its crystallinity and introducing thereinto a functional group so as to make its particular quality improved.

For producing a modified PVA, there are known (1) a method comprising copolymerization of a monomer having a functional group with vinyl acetate and hydrolysis thereof to thereby introduce a functional group into the side chain of PVA; (2) a method of introducing a functional group into the side chain of PVA through polymer reaction; and (3) a method of introducing a functional group into the end of PVA through chain transfer reaction during polymerization.

In the methods (1) and (3), however, the functional groups capable of being introduced into PVA are limited, since the vinyl ester monomers to be used therein have poor polymerizability and the methods require hydrolysis in order to produce PVA. In addition, since the functional groups in the conventional modified PVA are directly bonded to the main chain of PVA or are positioned extremely near thereto, they are easily influenced by the intramolecular interaction with the hydroxyl group in the vinyl alcohol unit and by the molecular motion of the main chain of PVA, they could not sufficiently exhibit their functions in many cases. As being expensive, the practical use of the method (2) on an industrial scale has been limited.

Methods of introducing a functional group, such as an amino group, a carboxyl group, a sulfonic acid group, a silanol group, a boronic acid group, a fluorine containing group, a hydroxyl group, a hydrocarbon group and an ethylenic unsaturated double bond, into PVA have been known. However, the functional groups as introduced into PVA according to the known methods could not exhibit their functions in many cases, since they are easily influenced by the intramolecular interaction with the hydroxyl group of PVA and by the molecular motion of the main chain of PVA.

Methods of introducing a functional group, such as a phenolic hydroxyl group, a phenyl group, a naphthalene group and a conjugated diene, into polyvinyl acetals have been known, but no method is known of introducing such a functional group into PVA.

On the other hand, no method is also known of introducing an amino acid group and a phenoxy group into PVA.

SUMMARY OF THE INVENTION

The object of the present invention is to provide a process for producing modified vinyl alcohol polymers having various functional groups and having excellent reactivity, crosslinkability, ionic interactivity, water-solubility, interfacial physical properties, low-temperature flexibility, etc.

The object of the present invention is also to provide a process for producing modified vinyl alcohol polymers having various functional groups, which could not be obtained by conventional methods.

We, the present inventors have assiduously studied in order to attain the above-mentioned objects and, as a result, have found a process for producing a vinyl alcohol polymer comprising reaction of a vinyl ester polymer (A) having an epoxy group with a compound (B) having a thiol or thioester group and hydrolysis thereof, said hydrolysis being conducted during or after said reaction (hereinafter referred to as the first aspect of the invention); and a process for producing a vinyl alcohol polymer comprising reaction of a vinyl ester polymer (C) having a thiol or thioester group with a compound (D) having an epoxy group and hydrolysis thereof, said hydrolysis being conducted during or after said reaction (hereinafter referred to as the second aspect of the invention). On the basis of these findings, we have completed the present invention.

DETAILED DESCRIPTION OF THE PREFERRED EMBODIMENTS

The first aspect of the invention is described below.

The vinyl ester polymer (A) having an epoxy group to be used in the present invention can be obtained through radical copolymerization of a vinyl ester monomer with a monomer having an epoxy group.

The vinyl ester monomer includes vinyl formate, vinyl acetate, vinyl propionate, vinyl pivalate, vinyl trifluoroacetate, etc.

The vinyl monomer having an epoxy group includes allyl glycidyl ether, methallyl glycidyl ether, butadiene monoepoxide, 1,2-epoxy-5-hexene, 1,2-epoxy-7-octene, 1,2-epoxy-9-decene, 8-hydroxy-6,7-epoxy-1-octene, 8-acetoxy-6,7-epoxy-1-octene, N-(2,3-epoxy)propylacrylamide, N-(2,3-epoxy)propylmethacrylamide, 4-acrylamidophenyl glycidyl ether, 3-acrylamidophenyl glycidyl ether, 4-methacrylamidophenyl glycidyl ether, 3-methacrylamidophenyl glycidyl ether, 3-methyl-3,4-epoxybutoxymethylolacrylamide, N-glycidoxymethylacrylamide, N-glycidoxymethylmethacrylamide, N-glycidoxyethylacrylamide, N-glycidoxyethylmethacrylamide, N-glycidoxypropylacrylamide, N-glycidoxypropylmethacrylamide, N-glycidoxybutylacrylamide, N-glycidoxybutylmethacrylamide, 4-acrylamidomethyl-2,5-dimethyl-phenyl glycidyl ether, 4-methacrylamidomethyl-2,5-dimethyl-phenyl glycidyl ether, acrylamidopropyldimethyl(2,3-epoxy)propylammonium chloride, methacrylamidopropyldimethyl(2,3-epoxy)propylammonium chloride, glycidyl methacrylate, etc.

The epoxy content of the vinyl ester polymer (A) is preferably from 0.01 to 30 mol %, more preferably from 0.02 to 20 mol %, most preferably from 0.05 to 15 mol %.

The viscosity-average molecular weight (Mv) of the vinyl ester polymer (A) is preferably from $10^3$ to $2000 \times 10^3$. The viscosity-average molecular weight (Mv) of the polymer shall be calculated from the intrinsic viscosity [η] thereof as measured in acetone at 30° C., according to the following equation:

$$\text{Intrinsic Viscosity } [\eta](dl/g) = 5 \times 10^{-4} \times Mv^{0.62}$$

The vinyl ester polymer (A) may comprise any monomer other than the monomers mentioned above. Such an additional monomer unit includes olefins such as ethylene, propylene, 1-butene, isobutene etc.; unsaturated acids, their salts and their mono- or di-($C_1$ to $C_{18}$)-alkyl esters, such as acrylic acid, methacrylic acid, crotonic acid, phthalic acid (anhydride), maleic acid (anhydride), itaconic acid (anhydride), etc.; acrylamides such as acrylamide, N-($C_1$ to $C_{18}$)-alkylacrylamides, N,N-dimethylacrylamide, 2-acrylamidopropanesulfonic acid and its salts, acrylamidopropyldimethylamine, its salts with acids and its quaternary salts, etc.; methacrylamides such as methacrylamide, N-($C_1$ to $C_{18}$)-alkylmethacrylamides, N,N-dimethylmethacrylamide, 2-methacrylamidopropanesulfonic acid and its salts, methacrylamidopropyldimethylamine, its salts with acids and its quaternary salts, etc.; N-vinylamides such as N-vinylpyrrolidone, N-vinylformamide, N-vinylacetamide, etc.; vinyl cyanides such as acrylonitrile, methacrylonitrile, etc.; vinyl ethers such as ($C_1$ to $C_{18}$)-alkyl vinyl ethers, hydroxyalkyl vinyl ethers, alkoxyalkyl vinyl ethers, etc.; vinyl halides such as vinyl chloride, vinylidene chloride, vinyl fluoride, vinylidene fluoride, vinyl bromide, etc.; vinylsilanes such as trimethoxyvinylsilane, etc.; as well as allyl acetate, allyl chloride, allyl alcohol, dimethylallyl alcohol, etc.

The compound (B) having a thiol or thioester group, which is used in the present invention, includes alkanethiols such as methanethiol, ethanethiol, n-propanethiol, i-propanethiol, n-butanethiol, s-butanethiol, i-butanethiol, t-butanethiol, n-octanethiol, n-dodecanethiol, t-dodecanethiol, n-octadecanethiol, etc.; thiols having a double bond, such as allylmercaptan, methallylmercaptan, 2-mercaptoethyl vinyl ether, 4-mercaptobutyl vinyl ether, 4-mercaptostyrene, 4-mercaptomethylstyrene, 3-hydroxy-4-mercapto-1-butene, N-(2-hydroxy- 3-mercapto) propylacrylamide, N-(2-hydroxy-3-mercapto) propoxymethylacrylamide, N-(3-hydroxy-4-mercapto) butoxymethylacrylamide, N-(2-hydroxy-3-mercapto) propylmethacrylamide, N-(2-hydroxy-3-mercapto) propoxymethylmethacrylamide, N-(3-hydroxy-4-mercapto) butoxymethylmethacrylamide, N-(2,2-dimethyl-4-hydroxy-5-mercapto)methylacrylamide, etc.; aromatic thiols such as thiophenol, 1-naphthalenethiol, 2-naphthalenethiol, 1-mercaptoanthracene, 9-mercaptoanthracene, etc.; phenol-containing thiols such as 2-mercaptophenol, 3-mercaptophenol, 4-mercaptophenol, 4-(2-mercaptoethyl) phenol, etc.; heterocyclic thiols such as furfurylmercaptan, 2-mercaptobenzimidazole, 2-mercaptoimidazole, 2-mercaptobenzoxazole, 2-mercaptobenzothiazole, 2-mercaptopyrimidine, 2-mercaptopyridine, 4-mercaptopyridine, 2-mercaptonicotinic acid, etc.; thiols having a hydroxyl group, such as 2-mercaptoethanol, 3-mercaptopropanol, thioglycerol, 1-thiosorbitol, polyethylene glycol mono-3-mercaptopropyl ether, polypropylene glycol mono-3-mercaptopropyl ether, polytetramethylene glycol mono-3-mercaptopropyl ether, etc.; thiols having a carboxyl group (or its salt or ester), such as thioglycolic acid (and its salts and esters), 2-mercaptopropionic acid (and its salts and esters), 3-mercaptopropionic acid (and its salts and esters), thiomalic acid (and its salts and esters), 2-mercaptobenzoic acid (and its salts and esters), 3-mercaptobenzoic acid (and its salts and esters), 4-mercaptobenzoic acid (and its salts and esters), 4-carboxyphenylethylthiol, etc.; thiols having an sulfonic acid group (and its salt and esters), such as 2-mercaptoethanesulfonic acid (and its salts and esters), 3-mercaptopropanesulfonic acid (and its salts and esters), 2-mercaptoethylbenzenesulfonic acid (and its salts and esters); thiols having an amino group and its salt such as 2-aminoethanethiol (and its salts), 3- (N-methylamino) propanethiol, 3-(N,N-dimethylamino)propanethiol, 2-aminothiophenol (and its salts), 3-aminothiophenol (and its salts), 4-aminothiophenol (and its salts), 4-(N,N-dimethylamino)thiophenol, etc.; amphoteric thiols such as cysteine, penicillamine, glutathione, N-(3-sulfopropyl)-N-(2-methyl-3-mercaptopropionamidopropyl)-N,N'-dimethylammonium betaine, etc.; thiocarboxylic acids such as thioacetic acid, thiobenzoic acid, etc.; thiols having a fluorine-containing group, such as 2-(perfluoroethyl) ethanethiol, 2-(perfluorobutyl)ethanethiol, 2-(perfluorohexyl)ethanethiol, 2-(perfluorooctyl) ethanethiol, 3-(perfluoroethyl)-2-hydroxypropanethiol, 3-(perfluorobutyl)-2-hydroxypropanethiol, 3-(perfluorohexyl)-2-hydroxypropanethiol, 3-(perfluorooctyl)-2-hydroxypropanethiol, N-(2-mercaptoethyl)-perfluoropropionic acid amide, N-(2-mercaptoethyl)-perfluoropentanoic acid amide, N-(2-mercaptoethyl)-perfluoroheptanoic acid amide, 2-(perfluoro-3-methylbutyl)ethanethiol, 2-(perfluoro-5-methylhexyl)ethanethiol, 2-(perfluoro-7-methyloctyl) ethanethiol, 3-(perfluoro-3-methylbutyl)-2-hydroxypropanethiol, 3-(perfluoro-5-methylhexyl)-2-hydroxypropanethiol, 3-(perfluoro-7-methyloctyl)-2-hydroxypropanethiol, (ω-H-fluoroethyl)methanethiol, (ω-H-fluorobutyl)methanethiol, (ω-H-fluorohexyl) methanethiol, (ω-H-fluorooctyl)methanethiol, (ω-H-fluoroethyl)methoxypropanethiol, (ω-H-fluorobutyl) methoxypropanethiol, (ω-H-fluorohexyl) methoxypropanethiol, (ω-H-fluorooctyl) methoxypropanethiol, etc.; thiols having a silyl group, such as 3-trimethoxysilylpropanethiol, 3-methyldimethoxysilylpropanethiol, 3-dimethylmethoxysilylpropanethiol, etc.; as well as 3-mercaptopropylboronic acid (and its esters), etc. In addition to these, also usable in the present invention are acetates and benzoates of these compounds having a thiol group.

As other examples of the compound (B) for use in the present invention, mentioned are polyalkylene glycols, such as polyethylene glycol, polypropylene glycol, polytetramethylene glycol or the like, having a thiol or thioester group; and vinyl acetate (co)polymers, vinyl pivalate (co)polymers, methyl methacrylate (co)polymers, styrene (co)polymers, n-butyl acrylate (co)polymers and other vinyl polymers of, for example, acrylamide, methacrylamide, N,N-dimethylacrylamide, N-isopropylacrylamide, N-vinylacetamide, N-vinylpyrrolidone and 2-methoxyethyl vinyl ether, having a thiol or thioester groups.

These compounds (B) can be used singly or as combined.

Depending on the reaction conditions employed, the compound (B) to be used can be in a protected form where the thiol group is protected, for example, as an isothiuronium salt thereof.

The reaction of the vinyl ester polymer (A) having an epoxy group with the compound (B) having a thiol or thioester group can be conducted in the absence of a solvent or in a solvent capable of dissolving the compound (B) and capable of dissolving or swelling the vinyl ester polymer (A). The solvent includes alcohols such as methanol, ethanol, n-propyl alcohol, n-butyl alcohol, etc.; aromatic compounds such as benzene, toluene, xylene, etc.; ethers such as tetrahydrofuran, dioxane, diethyl ether, etc.; hydrocarbons such as n-hexane, etc.; water, etc. These solvents can be used singly or as combined.

The reaction conditions for the vinyl ester polymer (A) and the compound (B) are generally such that the polymer concentration in a solvent, if used, should be from 5 to 90%, the ratio (by mol) of the concentration of the thiol or thioester group to the concentration of the epoxy group should be between 1.0 and 5.0, the reaction temperature should be between 0° C. and 250° C. and the reaction time should be between 0.01 hours and 20 hours.

For the reaction with the compound (B) having a thiol group, a basic compound that may be selected from, for example, amines (e.g., triethylamine, pyridine, triethanolamine, diethanolamine, ammonia), phosphines (e.g., tributylphosphine, triphenylphosphine), sodium hydroxide, tetraethylammonium hydroxide and sodium methylate is effective as the reaction catalyst. For the reaction with the compound (B) having a thioester group, a quaternary ammonium salt, such as tributylammonium chloride, tributylammonium bromide or the like, is effective as the reaction catalyst.

In order to prevent the oxidation of the thiol group in the reaction, the reaction system can be degassed or substituted with nitrogen, or an antioxidant or the like can be added thereto.

Any ordinary hydrolysis of polyvinyl esters that uses a basic or acid catalyst may apply to the present invention. For example, the hydrolysis of the present invention can be conducted in the presence of a basic catalyst, such as sodium hydroxide, potassium hydroxide, sodium methylate or the like, or an acid catalyst, such as p-toluenesulfonic acid or the like, as dissolved in an alcoholic or glycolic solvent such as methanol, ethanol, propanol, butanol, ethylene glycol or the like. In order to improve the solubility of the vinyl ester polymer and the catalyst used, an appropriate solvent, such as tetrahydrofuran, dioxane, dimethylsulfoxide, diethylene glycol dimethyl ether, toluene, acetone, water or the like, is optionally added to the reaction system. The conditions for the hydrolysis are generally such that the ratio (by mol) of the concentration of the catalyst to the concentration of the vinyl ester unit should be between 0.001 and 1.2, the reaction temperature should be between 0° C. and 180° C., and the reaction time should be between 0.1 hours and 20 hours.

The hydrolysis is conducted during or after the reaction of he vinyl ester polymer (A) with the compound (B).

Next, the second aspect of the present invention is described below.

The vinyl ester polymer (C) having a thiol or thioester group to be used in the present invention can be obtained through radical copolymerization of a vinyl ester monomer with a monomer having a thioester group or by a method comprising radical copolymerization of a vinyl ester monomer with a monomer having a protected thiol group followed by removal of the protective group from the resulting copolymer.

In addition, it may be possible to use vinyl ester polymers having a thioester group at one end thereof, which can be obtained through radical polymerization of a vinyl ester monomer using a chain transfer agent selected from, for example, thiocarboxylic acids such as thioacetic acid, thiobenzoic acid, etc., and monoacetates or monobenzoates of dithiols such as 2-acetylthioethanethiol, 2-benzoylthioethanethiol, 10-acetylthiodecanethiol, 10-benzoylthiodecanethiol, etc., and also to use vinyl ester polymers having a thiol group at one end thereof, which are derived from the above-mentioned polymers.

For the vinyl ester monomer, usable are those referred to in the first aspect of the invention hereinabove.

The monomer having a thioester group or a protected thiol group includes vinyl thioacetate, vinyl thiobenzoate, allyl thioacetate, allyl thiobenzoate, allyl 2-hydroxy-3-acetylthiopropyl ether, allyl 2-hydroxy-3-benzoylthiopropyl ether, 1-acetylthio-2-hydroxy-3-butene, 1-benzoylthio-2-hydroxy-3-butene, 1-acetylthio-2-hydroxy-5-hexene, 1-benzoylthio-2-hydroxy-5-hexene, 1-acetylthio-2-hydroxy-7-octene, 1-benzoylthio-2-hydroxy-7-octene, 1-acetylthio-2-hydroxy-9-decene, 1-benzoylthio-2-hydroxy-9-decene, N-(3-acetylthio-2-hydroxypropyl) acrylamide, N-(3-acetylthio-2-hydroxypropyl) methacrylamide, N-(3-acetylthio-2-hydroxypropyloxymethyl)acrylamide, N-(3-acetylthio-2-hydroxypropyloxymethyl)methacrylamide, 2-hydroxy-3-acetylthiopropyl methacrylate, allylisothiuronium chloride, etc.

The thiol or thioester group content of the vinyl ester polymer (C) is preferably from 0.01 to 30 mol %, more preferably from 0.02 to 20 mol %, most preferably from 0.05 to 15 mol %.

The viscosity-average molecular weight (Mv) of the vinyl ester polymer (C) is preferably from $10^3$ to $2000\times10^3$. The viscosity-average molecular weight (Mv) of the polymer (C) is calculated in the same manner as in the calculation of the viscosity-average molecular weight (Mv) of the vinyl ester polymer (A) to be used in the first aspect of the invention.

The vinyl ester polymer (C) may optionally contain any monomer other than those mentioned above. For such additional monomer units, usable are those referred to in the first aspect of the invention hereinabove.

The compound (D) having an epoxy group, which is used in the present invention, includes methyl glycidyl ether, ethyl glycidyl ether, allyl glycidyl ether, phenyl glycidyl ether, 2-ethylhexyl glycidyl ether, methanol(POE)n glycidyl ether (n=1 to 30), phenol(POE)n glycidyl ether (n=1 to 30), lauryl alcohol(POE)n glycidyl ether (n=1 to 30), methanol (POP)n glycidyl ether (n=1 to 30), neopentylglycol diglycidyl ether, 1,6-hexanediol diglycidyl ether, (POE)n diglycidyl ether (n=1 to 30), (POP)n diglycidyl ether, (n=1 to 70), (polyoxytetramethylene glycol)n diglycidyl ether (n=1 to 30), resorcinol diglycidyl ether, trimethylolpropane polyglycidyl ether, glycerol polyglycidyl ether, sorbital polyglycidyl ether, pentaerythritol polyglycidyl ether, diglycerin-polyglycerol polyglycidyl ether, polyglycerin polyglycidyl ether, sorbitol polyglycidyl ether, hydroquinone diglycidyl ether, ethylene oxide, propylene oxide, styrene oxide, cyclohexene oxide, butadiene monoepoxide, butadiene dioxide, 1,2-epoxy-5-hexene, 1,5-hexadiene dioxide, 1,2-epoxy-7-octene, 1,7-octadiene dioxide, 1,2-epoxy-9-decene, 1,9-decadiene dioxide, allyl glycidyl ether, methallyl glycidyl ether, 8-hydroxy-6,7-epoxy-l-octene, 8-acetoxy-6,7-epoxy-1-octene, N-(2,3-epoxy)propylacrylamide, N-(2,3-epoxy) propylmethacrylamide, 4-acrylamidophenyl glycidyl ether, 3-acrylamidophenyl glycidyl ether, 4-methacrylamidophenyl glycidyl ether, 3-methacrylamidophenyl glycidyl ether, N-glycidoxymethylacrylamide, N-glycidoxymethylmethacrylamide, N-glycidoxyethylacrylamide, N-glycidoxyethylmethacrylamide, N-glycidoxypropylacrylamide, N-glycidoxypropylmethacrylamide, N-glycidoxybutylacrylamide, N-glycidoxybutylmethacrylamide, 4-acrylamidomethyl-2,5-dimethylphenyl glycidyl ether, 4-methacrylamidomethyl-2,5-dimethylphenyl glycidyl ether, acrylamidopropyldimethyl (2,3-epoxy) propylammonium chloride, methacrylamidopropyldimethyl (2,3-epoxy)propylammonium chloride, 3-perfluorobutyl-1, 2-epoxypropane, 3-perfluorohexyl- 1,2-epoxypropane, 3-perfluorooctyl-1,2-epoxypropane, 3-perfluorodecyl-1,2-epoxypropane, 3-(perfluoro-2-methylbutyl)-1,2- epoxypropane, 3-(perfluoro-2-methylhexyl)-1,2-epoxypropane, 3-(perfluoro-2-methyloctyl)-1,2-epoxypropane, 3-(perfluoro-3-methyldecyl)-1,2-epoxypropane, 3-(1H, 1H, 5H-octafluoropentyloxy)-1,2-epoxypropane, 3-(1H, 1H, 5H-dodecafluoroheptyloxy)-1,2-epoxypropane, 3-(1H, 1H, 5H-hexadecafluorononyloxy)-1,2-epoxypropane, 2-(3,4-epoxycyclohexyl) ethyltrimethoxysilane, 3-glycidoxypropyltrimethoxysilane, 3-glycidoxypropylmethyldiethoxysilane, glycidyltrimethylammonium chloride, glycidyltriethylammonium chloride, glycidyl methacrylate, etc. (In the above, POE indicates polyoxyethylene; POP indicates polyoxypropylene; and n indicates the degree of polymerization of POE and POP.)

As other examples of the compound (D), mentioned are glycidyl ethers such as bisphenol A-type epoxy resins, bisphenol S-type epoxy resins, bisphenol F-type epoxy resins, etc. In addition, also usable are polymers having an epoxy group, which are obtained through radical copolymerization of a vinyl monomer (except vinyl esters) with a vinyl monomer having an epoxy group, such as glycidyl methacrylate, allyl glycidyl ether, butadiene monoepoxide, 1,2-epoxy-5-hexene, 1,2-epoxy-7-octene, 1,2-epoxy-9-decene, N-(2,3-epoxy)propylacrylamide, N-(2,3-epoxy)propylmethacrylamide, N-(glycidoxy)methylacrylamide, N-(glycidoxy)methylmethacrylamide, etc.

These compounds (D) can be used singly or as combined.

The reaction of the vinyl ester polymer (C) with the compound (D) can be conducted in the absence of a solvent or in a solvent capable of dissolving the compound (D) and capable of dissolving or swelling the vinyl ester polymer (C). For the solvent, usable are those as referred to in the first aspect of the invention hereinabove.

The reaction conditions for the vinyl ester polymer (C) and the compound (D) are generally such that the polymer concentration in a solvent, if used, should be from 5 to 90%, the ratio (by mol) of the concentration of the epoxy group to the concentration of the thiol or thioester group should be between 1.0 and 5.0, the reaction temperature should be between 0° C. and 250° C. and the reaction time should be between 0.01 hours and 20 hours.

The hydrolysis for the first aspect of the invention can be applied to that for the second aspect of the invention.

It is desirable that the molecular weight of the vinyl alcohol polymer to be obtained according to the method of the present invention (any of the first aspect and the second aspect of the invention) should be between 3 cps and 20,000 cps, preferably between 3 cps and 10,000 cps, more preferably between 3 cps and 5,000 cps, in terms of the viscosity of the 4-% solution of the polymer in dimethylsulfoxide (DMSO) at 20° C. as measured with a B-type viscometer.

The vinyl alcohol unit content of the polymer is preferably from 10 to 99.9 mol %, even more preferably from 50 to 99.9 mol %.

According to the present invention, it is possible to introduce into PVA a functional group, such as an amino acid group, a phenolic hydroxyl group, a phenyl group, a phenoxy group, a naphthalene group, a conjugated diene or the like, which could not be introduced into PVA or which was difficult to introduce thereinto according to any conventional methods. According to the present invention, in addition, it is possible to obtain a modified vinyl alcohol polymer capable of satisfactorily exhibiting the functions of a functional group as introduced thereinto, such as an amino group, an amino acid group, a carboxyl group, a sulfonic acid group, a silanol group, a boronic acid group, a fluoride group, a hydroxyl group, a hydrocarbon group, a phenolic hydroxyl group, a phenyl group, a phenylene group, a phenoxy group, a naphthalene group, an ethylenic unsaturated double bond, a conjugated diene, etc. Specifically, according to the present invention, a functional group can be introduced into PVA in the manner of the chemical structure mode of the following general formula (I) (for the first aspect of the invention) or (II) (for the second aspect of the invention):

wherein $R^1$, $R^2$ and $R^3$ each represent a hydrogen atom or an optionally-substituted hydrocarbon group having 8 or less carbon atoms; S represents a sulfur atom; and X represents a monovalent group containing a functional group.

As a result, selecting the type of the functional group to be introduced into PVA, it is possible to obtain a modified vinyl alcohol polymer having excellent reactivity, crosslinkability, ionic interactivity, water-solubility, interfacial physical properties, low-temperature flexibility, etc.

According to the present invention, moreover, it is possible to efficiently introduce any of the above-mentioned functional groups into PVA under relatively mild conditions (such that the reaction temperature is not higher than the boiling point of an ordinary solvent, methanol or, that is, 60° C. or lower, and that the ratio of the epoxy group to the thioester or thiol group is nearly 1 (one) by mol).

The vinyl alcohol polymer as obtained in the present invention can be used in fiber-sizing agents, fiber-treating agents, fiber-processing agents, binders in paper-processing agents such as paper-coating agents for, for example, clear coating or clay coating and over-coating agents for thermal printing paper, dispersing agents for organic and inorganic pigments, dispersion stabilizers in emulsion polymerization, dispersion stabilizers in suspension polymerization of, for example, vinyl chloride, binders for ceramics, imaging materials, photosensitive resins, materials for producing vinyl acetals such as formal and butyral, films, fibers, etc.

The vinyl alcohol polymer can be used singly or together with various polymers such as non-modified PVA, other modified PVA, starch (and its modified derivatives), cellulose derivatives, gums, gelatin, casein and the like and also with plasticizers, crosslinking agents, etc.

EXAMPLES

The present invention is described in more detail hereinbelow by means of the following examples, which, however, are not intended to restrict the scope of the invention. In the following examples, "parts" and "%" are by weight, unless otherwise specifically indicated.

Synthesis of Vinyl Ester Polymer Having Epoxy Group

Synthesis Example 1

405 parts of vinyl acetate monomer, 11 parts of allyl glycidyl ether and 30 parts of methanol were put into a reactor equipped with a stirrer, a reflux condenser, a nitrogen-introducing pipe and a thermometer, and subjected to substitution with nitrogen by bubbling with nitrogen gas for 15 minutes. Apart from this, a solution of an initiator was prepared by dissolving 4.5 parts of 2,2'-azoisobutyronitrile in 15 parts of methanol, and was also subjected to substitution with nitrogen by bubbling with nitrogen gas.

The reactor was heated. After its inner temperature reached 60° C., the initiator solution that had been separately prepared as above was added to the reactor in which the polymerization was thus initiated. After the polymerization was conducted for 4 hours at 60° C., the reaction system was cooled and the polymerization was stopped. The concentration of the solid formed was 54.8%. Next, the non-reacted vinyl acetate monomer was removed under reduced pressure at 30° C., while sometimes adding methanol to the system. Thus was obtained a methanolic solution of a polyvinyl acetate copolymer (having a concentration of 44.5%). A part of the methanolic solution was poured into ether whereby the polymer was recovered therefrom. The polymer was purified by re-precipitating it two times in acetone-ether, and then dried under reduced pressure at 40° C. Proton NMR of the pure polymer was analyzed, using GSX-270 Model (produced by Nippon Electronic Co.) where $CDCl_3$ was used as the solvent, and its intrinsic viscosity in acetone was measured according to JIS. The data revealed that the polymer obtained herein is polyvinyl acetate copolymer having an allyl glycidyl ether unit (epoxy group) content of 2.1 mol % and having a viscosity-average molecular weight of $80 \times 10^3$.

Synthesis Examples 2 to 9

In the same manner as in Synthesis Example 1 (except that the type and the amount of the vinyl ester monomer used, the amount of methanol used and the type and the amount of the initiator used were varied and that n-butanol was partly used for the removal of the non-reacted vinyl ester monomer), various vinyl ester polymers having an epoxy group were obtained as shown in Table 1.

herein), a thiol solution of 3.8 parts of thioacetic acid in methanol to be 40 parts in total (this is continuously added during the polymerization), and a solution of 0.16 parts of an initiator, 2,2'-azoisobutyronitrile as dissolved in 50 parts of methanol, and these were subjected to substitution with nitrogen by bubbling with nitrogen gas.

The reactor was heated. After its inner temperature reached 60° C., the former solution of thioacetic acid and the initiator solution that had been separately prepared as above were added to the reactor in that order, in which the polymerization was thus initiated. Immediately after this, the addition of the latter solution of thioacetic acid was started and continued, and the polymerization was continued along with the addition. The continuous addition of the thioacetic acid solution was conducted in accordance with the increase in the concentration of the solid as formed in the reactor with the procedure of the polymerization, which is shown in Table 2 below. The concentration of the solid formed was measured by sampling followed by measuring the weight of each sample.

With the continuous addition of the thioacetic acid solution, the polymerization was conducted for 4 hours. After this, the reaction system was cooled and the polymerization was stopped. The concentration of the polymer formed at the end of the polymerization was 50.1%.

Next, the non-reacted vinyl acetate monomer was removed under reduced pressure at 30° C., while sometimes adding methanol to the system. Thus was obtained a methanolic solution of a polyvinyl acetate polymer (having a concentration of 53.2%).

The polymer was purified and analyzed in the same manner as in Synthesis Example 1. The data revealed that the polymer obtained herein is polyvinyl acetate having an acetylthio group at one end thereof and having a viscosity-

TABLE 1

Examples of Vinyl Ester Polymers Having Epoxy Group

| Synthesis Example | Composition of Polyvinyl Ester Copolymer (mol %) | Viscosity-average Molecular Weight ($\times 10^3$) | Solvent Used | Concentration of Solution (%) |
|---|---|---|---|---|
| 2 | Vinyl acetate/Allyl glycidyl ether = 89/11 | 42 | Methanol | 56.7 |
| 3 | Vinyl acetate/1,2-Epoxy-5-hexene = 95.2/4.8 | 82 | Methanol | 43.2 |
| 4 | Vinyl acetate/Butadiene monoepoxide = 97.3/2.7 | 126 | Methanol | 32.1 |
| 5 | Vinyl acetate/1,2-Epoxy-7-octene = 98.5/1.5 | 158 | Methanol | 31.9 |
| 6 | Vinyl acetate/Vinyl pivalate/1,2-Epoxy-9-decene = 48/43/9 | 79 | Methanol | 47.8 |
| 7 | Vinyl Acetate/Ethylene/Allyl glycidyl ether = 92.8/5.5/1.7 | 57 | Methanol | 52.8 |
| 8 | Vinyl pivalate/1,2-Epoxy-5-hexene = 83.4/16.6 | 32 | n-butanol | 54.7 |
| 9 | Vinyl acetate/N-glycidoxymethylacrylamide = 98.2/1.8 | 130 | n-butanol | 32.0 |

Synthesis of Vinyl Ester Polymer Having Thioester Group at One End Thereof

Synthesis Example 10

440 parts of vinyl acetate monomer and 110 parts of ethanol were put into the same reactor as that used in Synthesis Example 1, and subjected to substitution with nitrogen by bubbling with nitrogen gas for 15 minutes. Apart from this, prepared were a thiol solution of 0.25 parts of thioacetic acid as dissolved in 10 parts of methanol (this is added at the start of the polymerization to be conducted average molecular weight of $31 \times 10^3$.

TABLE 2

| Solid Content (%) | 10 | 20 | 30 | 40 | 50 |
|---|---|---|---|---|---|
| Amount of Solution Added Continuously (parts) | 5.3 | 11.0 | 16.1 | 21.6 | 26.4 |

Synthesis of Methyl Methacrylate Polymer Having Thioester Group at One End Thereof

Synthesis Example 11

450 parts of methyl methacrylate monomer, 6.2 parts of thioacetic acid and 0.016 parts of tartaric acid were put into the same reactor as that used in Synthesis Example 1, and subjected to substitution with nitrogen by bubbling with nitrogen gas for 15 minutes. Apart from this, prepared was a 2-% solution of an initiator, 2,2'-azobis(2,4-dimethyl-4-methoxyvaleronitrile) in methyl ethyl ketone, which was also subjected to substitution with nitrogen by bubbling with nitrogen gas.

The reactor was heated. After its inner temperature reached 70° C., 24 parts of the initiator solution was added to the reactor continuously over a period of 4.5 hours, in which the polymerization was thus initiated. After this, the polymerization was stopped by cooling the reactor. The concentration of the polymer thus formed in the reactor was 43.1%. The thus-obtained polymer liquid was poured into 5000 parts of methanol, from which the polymer was recovered. The polymer was purified by re-precipitating it two times in toluene-methanol.

Proton NMR of the pure polymer was analyzed, using GSX-270 Model (produced by Nippon Electronic Co.) where $CDCl_3$ was used as the solvent, and its intrinsic viscosity in toluene was measured. The data revealed that the polymer obtained herein is methyl methacrylate polymer having an acetylthio group at one end thereof and having a viscosity-average molecular weight of $18 \times 10^3$.

Synthesis of Vinyl Ester Polymers Having Thioester or Thiol Group in Side Chain

Synthesis Example 12

405 parts of vinyl acetate monomer, 11.2 parts of allyl thioacetate and 30 parts of methanol were put into the same reactor as that used in Synthesis Example 1, and subjected to substitution with nitrogen by bubbling with nitrogen gas for 15 minutes. Apart from this, prepared was a solution of 4.5 parts of an initiator, 2,2'-azoisobutyronitrile as dissolved in 15 parts of methanol, which was also subjected to substitution with nitrogen by bubbling with nitrogen gas.

The reactor was heated. After its inner temperature reached 60° C., the initiator solution that had been prepared separately as above was added to the reactor, in which the polymerization was thus initiated. After the polymerization was conducted for 4 hours, it was stopped by cooling the reactor. The concentration of the polymer thus formed in the reactor was 56.2%.

Next, the non-reacted vinyl acetate monomer was removed under reduced pressure at 30° C., while sometimes adding methanol to the system. Thus was obtained a methanolic solution of a polyvinyl acetate polymer (having a concentration of 48.5%).

The polymer thus formed was purified and analyzed in the same manner as in Synthesis Example 1. The data revealed that the polymer obtained herein is polyvinyl acetate copolymer having an allyl thioacetate unit (thioester group) content of 2.3mol % and having a viscosity-average molecular weight of $87 \times 10^3$.

Synthesis Examples 13 to 19

In the same manner as in Synthesis Example 12 (except that the type and the amount of the vinyl ester monomer used, the amount of methanol used and the type and the amount of the initiator used were varied and that n-butanol was partly used for the removal of the non-reacted vinyl ester monomer), various vinyl ester polymers having an thioester or thiol group were obtained as shown in Table 3.

TABLE 3

Examples of Vinyl Ester Polymers Having Thioester or Thiol Group

| Synthesis Example | Composition of Polyvinyl Ester Copolymer (mol %) | Viscosity-average Molecular Weight $(\times 10^3)$ | Solvent Used | Concentration of Solution (%) |
|---|---|---|---|---|
| 13 | Vinyl acetate/Allyl 2-hydroxy-3-acetylthiopropyl ether = 88/12 | 37 | Methanol | 57.1 |
| 14 | Vinyl acetate/1-Acetylthio-2-hydroxy-5-hexene = 94.8/5.2 | 78 | Methanol | 45.8 |
| 15 | Vinyl acetate/1-Acetylthio-2-hydroxy-3-butene = 97.4/2.6 | 118 | Methanol | 33.1 |
| 16 | Vinyl acetate/Vinyl thioacetate = 98.4/1.6 | 161 | Methanol | 32.2 |
| 17 | Vinyl acetate/Vinyl pivalate/Allyl thioacetate = 48/43.5/8.5 | 81 | Methanol | 45.6 |
| 18 | Vinyl Acetate/Ethylene/Allyl thioacetate = 92.5/5.4/2.1 | 56 | Methanol | 50.6 |
| 19 | Vinyl pivalate/1-Acetylthio-2-hydroxy-5-hexene = 84.8/15.2 | 41 | n-butanol | 54.4 |

Synthesis of Polymer Having Epoxy Group

Synthesis Example 20

450 parts of methyl methacrylate monomer, 18 parts of glycidyl methacrylate and 485 parts of toluene were put into the same reactor as that used in Synthesis Example 1, and subjected to substitution with nitrogen by bubbling with nitrogen gas for 15 minutes. Apart from this, prepared was a solution of 4.5 parts of an initiator, 2,2'-azoisobutyronitrile as dissolved in 15 parts of toluene, which was also subjected to substitution with nitrogen by bubbling with nitrogen gas.

The reactor was heated. After its inner temperature reached 60° C., the initiator solution that had been prepared separately as above was added to the reactor, in which the polymerization was thus initiated. After the polymerization was conducted for 4 hours, it was stopped by cooling the reactor. The concentration of the polymer thus formed in the reactor was 34.5%. The polymer liquid was poured into 2000 parts of n-hexane, from which the polymer was recovered. This was purified by re-precipitating it two times in toluene-n-hexane, and then dried under reduced pressure at 40° C.

Proton NMR of the pure polymer was analyzed, using GSX-270 Model (produced by Nippon Electronic Co.) where $CDCl_3$ was used as the solvent, and its intrinsic viscosity in toluene was measured, from which its viscosity-average molecular weight was obtained through calculation. The data revealed that the polymer obtained herein is methyl methacrylate copolymer having an allyl glycidyl ether unit (epoxy group) content of 2.0 mol % and having a viscosity-average molecular weight of $85 \times 10^3$.

Example 1

100 parts of the methanolic solution of the vinyl acetate polymer having an epoxy group (concentration: 44.5%that had been obtained in Synthesis Example 1 was put into a reactor equipped with a stirrer, a reflux condenser, a nitrogen-introducing pipe and a thermometer, and bubbled with nitrogen gas for 15 minutes. Next, a solution as prepared by dissolving 2.2 parts of 2-mercaptoethanol and 0.03 parts of sodium hydroxide in 48 parts of methanol was added thereto. These were reacted at 50° C. for 1 hour while stirring, and then cooled to 40° C. 40 parts of 10-% methanolic solution of sodium hydroxide was added thereto, with which the product was hydrolyzed. After having been kept at 40° C. for 5 hours, the reaction mixture was pulverized and then neutralized with 8 parts of acetic acid added thereto.

Using a Soxhlet's extractor, this was washed with methanol for 48 hours and then dried at 60° C. for 20 hours. Thus was obtained a modified vinyl alcohol polymer. IR and proton NMR (in $d_6$-DMSO) of the polymer were analyzed, which revealed that the epoxy group completely disappeared in the polymer, that 2.1 mol % of 2-hydroxyethylthio group was introduced into the polymer, and that the vinyl alcohol unit content of the polymer is 97.0 mol %. A 4-% solution of the polymer in DMSO was prepared, and its viscosity at 20° C. was measured to be 60.3 cps.

Examples 2 to 20

Various modified vinyl alcohol polymers were prepared in the same manner as in Example 1, except that the conditions shown in Table 4 were employed herein. The results obtained herein are shown in Table 4 along with the conditions employed.

TABLE 4(A)

| Example | Vinyl Ester Polymer | | Solvent | | Thiol/Thioester | | Catalyst, etc. | | Temperature (°C.) | Time (hr) |
|---|---|---|---|---|---|---|---|---|---|---|
| 2 | Synthesis 1 | Example 100 | Methanol | 48 | TGL | 3.0 | TEA | 0.6 | 50 | 2 |
| 3 | Synthesis 2 | Example 100 | THF | 89 | n-DDT | 26.7 | NaOH | 0.05 | 50 | 2 |
| 4 | Synthesis 3 | Example 100 | Methanol | 44 | TP | 7.0 | TEA | 0.4 | 50 | 2 |
| 5 | Synthesis 6 | Example 100 | n-butanol | 59 | 2-MES | 13.3 | NaOH | 3.75 | 50 | 2 |
| 6 | Synthesis 4 | Example 100 | Methanol | 5 | PFHO | 12.4 | NaOH | 0.03 | 50 | 2 |
| 7 | Synthesis 1 | Example 100 | Methanol | 48 | AM | 2.3 | NaOH | 0.03 | 50 | 2 |
| 8 | Synthesis 1 | Example 100 | Methanol Water | 38 10 | 2-AET | 8.0 | NaOH | 0.03 | 50 | 2 |
| 9 | Synthesis 1 | Example 100 | Methanol Water | 44 4 | CYT | 2.7 | NaOH | 0.58 | 50 | 2 |
| 10 | Synthesis 5 | Example 100 | Methanol | 7 | 3-MST | 3.3 | TBP | 0.5 | 50 | 2 |
| 11 | Synthesis 7 | Example 100 | Methanol | 76 | 3-MPB | 3.1 | TBP | 0.5 | 50 | 2 |
| 12 | Synthesis 8 | Example 100 | n-butanol | 82 | 2-ATN | 38.0 | TBAC | 2.0 | 117 | 2 |
| 13 | Synthesis 9 | Example 100 | Methanol | 7 | TGL | 1.25 | NaOH | 0.03 | 50 | 2 |
| 14 | Synthesis 1 | Example 100 | Methanol | 48 | 4-MPH | 2.9 | NaOH | 0.46 | 50 | 2 |
| 15 | Synthesis 1 | Example 100 | Methanol | 48 | 2-ATP | 8.0 | NaOH | 0.03 | 50 | 2 |
| 16 | Synthesis 1 | Example 100 | Methanol | 48 | 4-MBA | 4.2 | NaOH | 0.91 | 50 | 2 |
| 17 | Synthesis 1 | Example 100 | Methanol Water | 42 6 | MSA | 4.2 | NaOH | 1.81 | 50 | 2 |
| 18 | Synthesis 1 | Example 100 | Methanol | 48 | FM | 2.9 | NaOH | 0.03 | 50 | 2 |
| 19 | Synthesis 4 | Example 100 | Methanol | 36 | Synthesis 10 | Example 1000 | NaOH | 0.04 | 50 | 2 |
| 20 | Synthesis 4 | Example 100 | THF | 54 | Synthesis 11 | Example 300 | NaOH | 0.04 | 50 | 2 |

TABLE 4(B)

| Example | Components for Hydrolysis (parts)/Conditions | | | | Details of Modified Polyvinyl Alcohol | | | |
|---|---|---|---|---|---|---|---|---|
| | 10% NaOH | Acetic Acid | Temperature (°C.) | Time (hr) | Modified Group | Degree of Modification (mol %) | VA Content (mol %) | Viscosity in DMSO (cs) |
| 2 | 40 | 8 | 40 | 5 | 1,2-Dihydroxypropyl group | 2.1 | 96.7 | 61.2 |
| 3 | 80 | 10 | 40 | 5 | n-dodecylthio group | 11.1 | 82.1 | 19.0 |
| 4 | 40 | 8 | 40 | 5 | Phenyl group | 4.8 | 93.0 | 59.8 |
| 5 | 60 | 8 | 65 | 5 | Na 2-ethylsulfonate | 9.0 | 77.6 | 59.1 |
| 6 | 40 | 8 | 40 | 5 | 3-Perfluorooctyl group | 2.8 | 95.1 | 111 |
| 7 | 40 | 8 | 40 | 5 | Allylthio group | 2.1 | 97.0 | 59.4 |
| 8 | 40 | 8 | 40 | 5 | 2-Aminoethylthio group | 2.1 | 96.0 | 65.0 |
| 9 | 40 | 8 | 40 | 5 | Cysteine residue | 2.1 | 97.1 | 65.4 |
| 10 | 40 | 8 | 40 | 5 | Silyl-containing group | 1.5 | 97.2 | 110 |
| 11 | 40 | 8 | 40 | 5 | Boronic acid-containing group | 1.8 | 91.1 | 29.5 |
| 12 | 120 | 25 | 65 | 5 | Naphthalenethio group | 16.7 | 80.1 | 13.6 |
| 13 | 40 | 2 | 40 | 5 | 1,2-Dihydroxy-propylthio group | 1.8 | 123 | 96.4 |
| 14 | 40 | 8 | 40 | 5 | Phenol-containing group | 2.1 | 96.5 | 60.1 |
| 15 | 40 | 8 | 40 | 5 | Aniline-containing group | 2.1 | 97.0 | 61.2 |
| 16 | 40 | 8 | 40 | 5 | Benzoic acid-containing group | 2.1 | 96.8 | 59.6 |
| 17 | 40 | 8 | 40 | 5 | Succinic acid-containing group | 2.0 | 96.7 | 59.6 |
| 18 | 40 | 8 | 40 | 5 | Furan ring-containing group | 2.1 | 97.0 | 59.8 |
| 19 | 40 | 8 | 40 | 5 | Vinyl alcohol polymer graft | — | — | — |
| 20 | 40 | 8 | 40 | 5 | Methyl methacrylate polymer graft | — | — | — |

NOTES TO TABLE 4

TGL: Thioglycerin
n-DDT: n-dodecanethiol
TP: Thiophenol
2-MES: 2-Mercaptoethanesulfonic acid
PFHO: 3-(Perfluorooctyl)-2-hydroxypropanethiol
AM: Allylmercaptan
2-AET: 2-Aminoethanethiol
CYT: Cysteine
3-MST: 3-Trimethoxysilylpropanethiol
3-MPB: Dimethyl 3-mercaptopropylboronate
2-ATN: 2-Acetylthionaphthalene
4-MPH: 4-Mercaptophenol
2-ATP: 2-Aminothiophenol
4-MBA: 4-Mercaptobenzoic acid
MSA: Mercaptosuccinic acid
FM: Furfurylmercaptan
TEA: Triethylamine
TBP: Tributylphosphine
NaOH: Sodium hydroxide
TBAC: Tetraethylammonium chloride
THF: Tetrahydrofuran
VA: Vinyl alcohol unit Example 21

100 parts of the methanolic solution of the vinyl acetate polymer having a thioester group at one end thereof (concentration: 44.5%) that had been obtained in Synthesis Example 10 and a solution of 1.3 parts of a compound having an epoxy group at the both ends thereof shown as the following general formula (III) (where $R^1$, $R^2$, $R^3$ and $R^4$=H, A=C(CH$_3$)$_2$, n=2) (Epikote 1001, trade name, produced by Yuka Shell Epoxy Co.) as dissolved in 30 parts of methyl acetate were put into the same reactor as that used in Example 1, and bubbled with nitrogen gas for 15 minutes. Next, a solution of 0.1 parts of sodium hydroxide as dissolved in 18 parts of methanol was added thereto. These were reacted at 40° C. for 1 hour while stirring, and then 20 parts of a 10-% solution of sodium hydroxide in methanol was added thereto at the same temperature, with which the product was hydrolyzed. After having been kept at 40° C. for 5 hours, the reaction mixture was pulverized and then neutralized with 3 parts of acetic acid added thereto.

Using a Soxhlet's extractor, this was washed with tetrahydrofuran for 48 hours and then dried at 60° C. for 20 hours. Thus was obtained a vinyl alcohol block copolymer. IR and proton NMR (in $d_6$-DMSO) of the polymer were analyzed, which revealed that the epoxy group completely disappeared in the polymer, that the polymer is a block copolymer composed of a PVA component and a polyphenoxy component, that the polyphenoxy content of the polymer is 5.4%, and that the vinyl alcohol content of the PVA component of the polymer is 98.7 mol %. A 4-% solution of the polymer in DMSO was prepared, and its viscosity at 20° C. was measured to be 36.1 cps.

Next, 2 parts of triethanolamine was added thereto and stirred at 30° C. for 1 hour. Next, a solution of 13.5 parts of phenyl glycidyl ether as dissolved in 48 parts of methanol was added thereto. These were reacted at 50° C. for 2 hours while stirring, and then cooled to 40° C. 40 parts of a 10-% solution of sodium hydroxide in methanol was added thereto, with which the product was hydrolyzed. After having been kept at 40° C. for 5 hours, the reaction mixture was pulverized and then neutralized with 8 parts of acetic acid added thereto.

The polymer formed was purified in the same manner as in Example 21. It was verified that the epoxy group completely disappeared in the polymer, that 2.3 mol % of a phenyl group was introduced into the polymer, and that the vinyl alcohol content of the polymer is 96.6 mol %. A 4-%

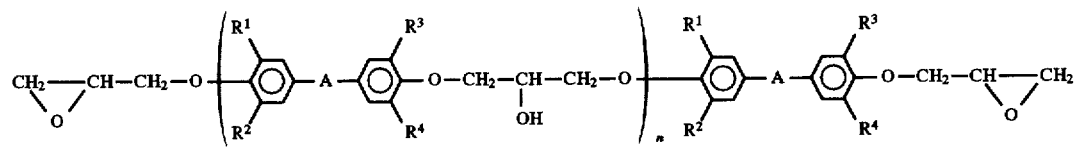

(III)

Examples 22 to 26

Various modified vinyl alcohol polymers were prepared in the same manner as in Example 21, except that the conditions shown in Table 5 were employed herein. The results obtained herein are shown in Table 5 along with the conditions employed.

Example 27

100 parts of the methanolic solution of the vinyl acetate polymer having a thioester group in the side chain (concentration: 48.5%) that had been obtained in Synthesis Example 12 was put into the same reactor as that used in Example 21, and bubbled with nitrogen gas for 15 minutes.

solution of the polymer in DMSO was prepared, and its viscosity at 20° C. was measured to be 60.1 cps.

Examples 28 to 35

Various modified vinyl alcohol polymers were prepared in the same manner as in Example 27, except that the conditions shown in Table 5 were employed herein. The results obtained herein are shown in Table 5 along with the conditions employed.

TABLE 5(A)

| | Components (parts)/Reaction Conditions | | | | | | | | | |
|---|---|---|---|---|---|---|---|---|---|---|
| Example | Vinyl Ester | Polymer | Solvent | | Epoxy Compound | | Catalyst, etc. | | Temperature (°C.) | Time (hr) |
| 22 | Synthesis 10 | Example 100 | Methanol | 30 | POGDGE | 0.75 | NaOH | 0.1 | 30 | 1 |
| 23 | Synthesis 10 | Example 100 | Methanol | 30 | PTGDGE | 1.60 | NaOH | 0.1 | 30 | 1 |
| 24 | Synthesis 10 | Example 100 | Methanol | 30 | FOE | 1.16 | NaOH | 0.1 | 30 | 1 |
| 25 | Synthesis 10 | Example 100 | Methanol | 30 | LPOEGE | 2.74 | NaOH | 0.1 | 30 | 1 |
| 26 | Synthesis 10 | Example 100 | Methanol | 30 | AGE | 0.34 | NaOH | 0.1 | 30 | 1 |
| 28 | Synthesis 13 | Example 100 | Methanol | 87.7 | STO | 22.0 | $NH_3$ | 6.0 | 30 50 | 1 2 |
| 29 | Synthesis 14 | Example 100 | Methanol | 52.7 | FOE | 52.8 | $NH_3$ | 3.0 | 30 50 | 1 2 |
| 30 | Synthesis 15 | Example 100 | Methanol | 10.3 | AGE | 11.3 | $NH_3$ | 2.0 | 30 50 | 1 2 |
| 31 | Synthesis 16 | Example 100 | Methanol | 7.0 | MGE | 4.0 | $NH_3$ | 1.0 | 30 50 | 1 2 |
| 32 | Synthesis 17 | Example 100 | Methanol | 52.0 | MPOEGE | 43.0 | NaOH | 2.0 | 30 50 | 1 2 |
| 33 | Synthesis 18 | Example 100 | Methanol | 68.7 | CHO | 8.8 | $NH_3$ | 2.0 | 30 50 | 1 2 |
| 34 | Synthesis 19 | Example 100 | Methanol | 81.3 | 2-EHGE | 21.0 | NaOH | 6.0 | 30 50 | 1 2 |
| 35 | Synthesis 12 | Example 100 | THF | 82.2 | Synthesis 20 | Example 22.4 | NaOH | 2.0 | 30 50 | 1 2 |

TABLE 5(B)

| | Components for Hydrolysis (parts)/Conditions | | | | | Degree | | |
|---|---|---|---|---|---|---|---|---|
| Example | 10% NaOH | Acetic Acid | Temperature (°C.) | Time (hr) | Modified Group | Modification (mol %) | VA Content (mol %) | Viscosity in DMSO (cs) |
| 22 | 20 | 3 | 40 | 5 | Polyoxy-ethylene group | 3.0 wt. % | 99.1 | 35.2 |
| 23 | 20 | 3 | 40 | 5 | Polyoxy-tetramethylene group | 6.2 wt. % | 98.5 | 36.1 |
| 24 | 20 | 3 | 40 | 5 | Fluorine-containing group | 4.3 wt. % | 99.2 | 10.2 |
| 25 | 20 | 3 | 40 | 5 | Lauryl poly-oxyethylene | 9.8 wt. % | 99.0 | 11.3 |
| 26 | 20 | 3 | 40 | 5 | Allyl group | 1.3 wt. % | 98.6 | 10.5 |
| 28 | 40 | 8 | 40 | 5 | Phenyl group | 12.1 | 71.2 | 16.1 |
| 29 | 40 | 8 | 40 | 5 | Fluorine-containing group | 5.1 | 90.2 | 50.2 |
| 30 | 40 | 8 | 40 | 5 | Allyl group | 2.6 | 95.3 | 108 |
| 31 | 40 | 8 | 40 | 5 | Methyl group | 1.5 | 97.8 | 175 |
| 32 | 40 | 8 | 65 | 5 | Polyoxy-ethylene group | 8.5 | 60.6 | 54.2 |
| 33 | 40 | 8 | 40 | 5 | Cyclohexane group | 2.1 | 92.1 | 30.1 |
| 34 | 180(*) | 25 | 65 | 5 | 2-Ethylhexyl group | 15.3 | 83.6 | 18.9 |
| 35 | 40 | 8 | 40 | 5 | Methyl methacrylate polymer | — | — | — |

NOTES TO TABLE 5

(*1): 10-% Potassium hydroxide solution in methanol used.
POEDGE: POE(n=10) diglycidyl ether
LPOEGE: Lauryl alcohol POE(n=15) glycidyl ether
FOE: 3-(Perfluoro-2-methyloctyl)-1,2-epoxypropane
TELA: Triethanolamine
PTGDGE: PTG(n=18) diglycidyl ether
STO: Styrene oxide
AGE: Allyl glycidyl ether
MGE: Methyl glycidyl ether
MPOEGE: Methanol POE(n=10) glycidyl ether
CHO: Cyclohexene oxide
2-EHGE: 2-Ethylhexyl glycidyl ether
PGGE: Polyglycerin glycidyl ether
TBAC: Tetraethylammonium chloride
NaOH: Sodium hydroxide
THF: Tetrahydrofuran
VA: Vinyl alcohol unit

What is claimed is:

1. A process for producing a vinyl alcohol polymer, comprising:
   reacting a vinyl acetate polymer (A) having an epoxy group with a compound (B) having a thiol or thioester group; and
   hydrolyzing the polymer, said hydrolysis being conducted during or subsequent to the reaction of compound (B) with the polymer (A).

2. The process of claim 1, wherein the epoxy group content of the vinyl acetate polymer (A) ranges from 0.01 to 30 mol %.

3. The process of claim 2, wherein said epoxy group content ranges from 0.02 to 20 mol %.

4. The process of claim 1, wherein the viscosity average molecular weight (Mv) of said vinyl acetate polymer (A) ranges from $10^3$ to $2,000 \times 10^3$.

5. The process of claim 1, wherein, during the preparation of vinyl acetate polymer (A), vinyl acetate monomer is copolymerized with at least one other copolymerizable monomer selected from the group consisting of olefins, unsaturated acids (salts thereof), acrylamides, methacrylamides, N-vinylamides, vinylcyanides, vinylethers, vinylhalides, vinylsilanes, allyl acetate, allyl chloride, allyl alcohol and dimethylallyl alcohol.

6. The process of claim 1, wherein said compound (B), having a thiol or thioester group, is an alkanethiol, a thiol having a double bond, an aromatic thiol, a phenol-containing thiol, a heterocyclic thiol, a thiol containing a hydroxyl group, a thiol having a carboxyl group, a thiol having a sulfonic acid group, a thiol having an amino group, a thiocarboxylic acid, a thiol having a fluorine-containing group, a thiol having a silyl group and 3-mercaptopropylboronic acid.

7. The process of claim 1, wherein said compound (B) is a polyalkyleneglycol, vinyl acetate (co)polymer, vinyl pivalate (co)polymer, methyl methacrylate (co)polymer, styrene (co)polymer, N-butylacrylate (co)polymer or other vinyl polymer having a thiol or thioester group.

8. The process of claim 1, wherein the concentration of polymer (A) in a solvent solution ranges from 5 to 90% and the amount of compound (B) is such that the mol ratio of the thiol or thioester group to the concentration of epoxy groups ranges from 1.0 to 5.0.

9. The process of claim 1, wherein said hydrolysis reaction is conducted at a temperature of 0° C. to 180° C., said reaction solution containing a catalyst in a mol ratio amount relative to the concentration of vinylester units ranging from 0.001 to 1.2.

10. A process for producing a vinyl alcohol polymer, comprising:
    reacting a vinyl acetate polymer (C) having a thiol or thioester group with a compound (D) having an epoxy group; and
    hydrolyzing the polymer, said hydrolysis being conducted as the reaction proceeds or subsequent to the reaction.

11. The process of claim 10, wherein the thiol or thioester group content of the vinyl acetate polymer (C) ranges from 0.01 to 30 mol %.

12. The process of claim 11, wherein said thiol or thioester group content ranges from 0.02 to 20 mol %.

13. The process of claim 10, wherein the viscosity-average molecular weight (Mv) of said vinyl acetate polymer (C) ranges from $10^3$ to $2,000 \times 10^3$.

14. The process of claim 10, wherein said compound (B), having an epoxy group, is methylglycidyl ether, ethyl glycidyl ether, allyl glycidyl ether, phenyl glycidyl ether, 2-ethylhexyl glycidyl ether, methanol(POE)n glycidyl ether (n=1 to 30), phenol(POE)$_n$ glycidyl ether (n=1 to 30), lauryl alcohol(POE)$_n$ glycidyl ether (n=1 to 30), methanol(POP)$_n$ glycidyl ether (n=1 to 30), neopentylglycol diglycidyl ether, 1,6-hexanediol diglycidyl ether, (POE)N diglycidyl ether (n=1 to 30), (POP)$_n$ diglycidyl ether, (n=1 to 70), (polyoxytetramethylene glycol)$_n$ diglycidyl ether (n=1 to 30), resorcinol diglycidyl ether, trimethylolpropane polyglycidyl ether, glycerol polyglycidyl ether, sorbital polyglycidyl ether, pentaerythritol polyglycidyl ether, diglycerin-polyglycerol polyglycidyl ether, polyglycerin polyglycidyl ether, sorbitol polyglycidyl ether, hydroquinone diglycidyl ether, ethylene oxide, propylene oxide, styrene oxide, cyclohexene oxide, butadiene monoepoxide, butadiene dioxide, 1,2-epoxy-5-hexene, 1,5-hexadiene dioxide, 1,2-epoxy-7-octene, 1,7-octadiene dioxide, 1,2-epoxy-9-decene, 1,9-decadiene dioxide, allyl glycidyl ether, methallyl glycidyl ether, 8-hydroxy-6,7-epoxy-1-octene, 8-acetoxy-6,7-epoxy-1-octene, N-(2,3-epoxy)propylacrylamide, N-(2,3-epoxy)propylmethacrylamide, 4-acrylamidophenyl glycidyl ether, 3-acrylamidophenyl glycidyl ether, 4-methacrylamidophenyl glycidyl ether, 3-methacrylamidophenyl glycidyl ether, N-glycidoxymethylacrylamide, N-glycidoxymethylmethacrylamide, N-glycidoxyethylacrylamide, N-glycidoxyethylmethacrylamide, N-glycidoxypropylacrylamide, N-glycidoxypropylmethacrylamide, N-glycidoxybutylacrylamide, N-glycidoxybutylmethacrylamide, 4-acrylamidomethyl-2,5-dimethylphenyl glycidyl ether, 4-methacrylamidomethyl-2,5-dimethylphenyl glycidyl ether, acrylamidopropyldimethyl(2,3-epoxy)propylammonium chloride, methacrylamidopropyldimethyl(2,3-epoxy)propylammonium chloride, 3-perfluorobutyl-1,2-epoxypropane, 3-perfluorohexyl-1,2-epoxypropane, 3-perfluorooctyl-1,2-epoxypropane, 3-perfluorodecyl-1,2-epoxypropane, 3-(perfluoro-2-methylbutyl)-1,2-epoxypropane, 3-(perfluoro-2-methylhexyl)-1,2-epoxypropane, 3-(perfluoro-2-methyloctyl)-1,2-epoxypropane, 3-perfluoro-3-methyldecyl)-1,2-epoxypropane, 3-(1H,1H,5H-octafluoropentyloxy)-1,2-epoxypropane, 3-(1H,1H,5H-dodecafluoroheptyloxy)-1,2-epoxypropane, 3-(1H,1H,5H-hexadecafluorononyloxy)-1,2-epoxypropane, 2-(3,4-epoxycyclohexyl)ethyltrimethoxysilane, 3-glycidoxypropyltrimethoxysilane, 3-glycidoxypropylmethyldiethoxysilane, glycidyltrimethylammonium chloride, glycidyltriethylammonium chloride and glycidyl methacrylate.

15. The process of claim 10, wherein said compound (D) is a bisphenol A epoxy resin, a bisphenol S epoxy resin or a bisphenol F epoxy resin.

16. The process of claim 10, wherein the concentration of vinyl acetate polymer (C) in a solvent solution ranges from 5 to 90% and the molar ratio of the concentration of epoxy groups in compound (D) to the concentration of thiol or thioester groups in polymer (C) ranges from 1.0 to 5.0.

17. The process of claim 12, wherein the reaction temperature ranges from 0° C. to 250° C. for a time ranging from 0.01 hours to 20 hours.

* * * * *